United States Patent
Liu et al.

(10) Patent No.: US 11,064,719 B2
(45) Date of Patent: Jul. 20, 2021

(54) APPROACH FOR PROCESSING MARBLE-LIKE BEEF

(71) Applicant: Jiangnan University, Wuxi (CN)

(72) Inventors: Yuanfa Liu, Wuxi (CN); Zhanyang Guo, Wuxi (CN); Jinwei Li, Wuxi (CN); Chen Cao, Wuxi (CN); Jiang Jiang, Wuxi (CN)

(73) Assignee: JIANGNAN UNIVERSITY, Wuxi (CN)

(*) Notice: Subject to any disclaimer, the term of this patent is extended or adjusted under 35 U.S.C. 154(b) by 0 days.

(21) Appl. No.: 16/804,167

(22) Filed: Feb. 28, 2020

(65) Prior Publication Data

US 2020/0196642 A1 Jun. 25, 2020

Related U.S. Application Data

(63) Continuation of application No. PCT/CN2019/077069, filed on Mar. 6, 2019.

(30) Foreign Application Priority Data

Jan. 10, 2019 (CN) .......................... 201910023726.X

(51) Int. Cl.
*A23L 5/10* (2016.01)
*A23D 9/007* (2006.01)

(52) U.S. Cl.
CPC ................ *A23L 5/11* (2016.08); *A23D 9/007* (2013.01)

(58) Field of Classification Search
CPC ...................................................... A23L 5/00
(Continued)

(56) References Cited

U.S. PATENT DOCUMENTS

| 5,039,528 A | 8/1991 | Olney |
| 5,039,538 A * | 8/1991 | Tamaki ................... A23L 13/00 426/281 |
| 2004/0151803 A1* | 8/2004 | Wolfschoon-Pombo .................... A23L 13/48 426/41 |

FOREIGN PATENT DOCUMENTS

| AU | 8289710 A | * 11/1981 |
| CN | 101091574 A | 12/2007 |

(Continued)

OTHER PUBLICATIONS

PCT/CN2019/077069 ISA210 ISR dated Oct. 10, 2019.
PCT/CN2019/077069 ISA237 dated Oct. 10, 2019.

*Primary Examiner* — Brent T O'Hern
(74) *Attorney, Agent, or Firm* — IPro, PLLC

(57) ABSTRACT

The disclosure discloses a production method of marbled beef, and belongs to the field of food processing. The processing steps of the method are: freezing, thawing of beef, preparation of a gel emulsion, injection, wrap shaping, quick freezing, cutting and packaging, and hot dipping. The preparation method of the process of the disclosure can realize high-efficiency and standardized industrial production. By injecting beef with the formulated gel emulsion, the fat content and high-quality protein content of the beef can be increased, thereby improving the sensory properties and flavor of the beef, and producing high-quality beef. The gel emulsion for preparing marbled beef of the disclosure is liquid and is low in viscosity when the temperature is higher than 40° C., and therefore the gel emulsion is convenient for injection into beef, and can be uniformly dispersed in beef to form a delicate marble pattern. When the temperature is lower than 20° C., the gel emulsion forms a solid in beef tissue. The beef prepared according to the method of the disclosure shows a white fat pattern at low temperature (Continued)

(0-25° C.), and is closer to natural marbled beef in appearance and structure.

2 Claims, 4 Drawing Sheets

(58) Field of Classification Search
USPC .......................................................... 426/417
See application file for complete search history.

(56) References Cited

FOREIGN PATENT DOCUMENTS

| | | | | |
|---|---|---|---|---|
| CN | 101961111 | A | 2/2011 | |
| CN | 103040006 | A | 4/2013 | |
| CN | 105433269 | A | 3/2016 | |
| CN | 108925880 | A | 12/2018 | |
| JP | 58089161 | A * | 5/1983 | ............. A23L 13/72 |
| JP | 06335368 | A | 12/1994 | |
| JP | 2008161097 | A | 7/2008 | |
| JP | 5889161 | A | 3/2016 | |
| WO | 2010002977 | A1 | 1/2010 | |

* cited by examiner (a) (b)

APPROACH FOR PROCESSING MARBLE-LIKE BEEF

TECHNICAL FIELD

The disclosure relates to a new approach for processing marble-like beef, and belongs to the field of food processing.

BACKGROUND

Natural marbled beef is superficially red-and-white beef formed by deposition of fat cells in internal perimysium of the muscle tissue during the fattening stage of cattle. The deposited white fat cells are shaped like marble, so beef is called frosted beef or marbled beef. This kind of beef is rich in flavor and rich in nutrition. The top-level marbled beef is melted in the mouth, is fresh, tender and juicy, and is loved by people. Marbled beef originates from Japanese beef. Although Japanese beef is cultivated worldwide, the annual production of the marbled beef is small due to the geographical location, climate, and complicated breeding methods, moreover the price is high, and thus the marbled beef belongs to high-end products. On the other hand, according to Kazala, et al. (1997), beef with a fat content of less than 3% has poor palatability. The fat content of most of beef of ordinary breeding cattle is less than 3%, the palatability of beef is poor, and the fiber is rough and not delicious, which affects the edibility and value of beef.

SUMMARY

Technical Problem

The technical problem to be solved by the disclosure is to provide base oil for producing marbled beef and a method for producing marbled beef by using the base oil.

Technical Scheme

The disclosure provides base oil for producing marbled beef, which can improve the taste, flavor and sensory properties of beef with low fat content. The base oil is liquid and is low in viscosity when the temperature is higher than 40° C., and the base oil is convenient for injection into beef and is uniformly dispersed in beef to form a delicate marble pattern. When the temperature is lower than 20° C. and the base oil is not frozen, the base oil forms a solid in the beef tissue. The base oil shows a white fat pattern at low temperature (0-25° C.), making the appearance and structure of the beef closer to natural marbled beef. The base oil may also be referred to as a gel emulsion (for convenience, the subsequent base oil is all referred to as the gel emulsion.

Specifically, the disclosure firstly provides a gel emulsion for producing marbled beef, comprising the following components per 100 kg: 10-45 kg of purified beef fat, 0.5-4.5 kg of whey protein isolate, 0-2 kg of purified table salt, 0.5-3 kg of saccharide, 0.4-1.5 kg of sodium tripolyphosphate, 2-5 kg of edible gelatin, and 39-85 kg of water.

In an embodiment of the disclosure, the saccharide is monosaccharide or disaccharide, preferably glucose.

In an embodiment of the disclosure, the purified table salt is also referred to as refined table salt, which is table salt refined from sea salt, lake salt, rock salt, well salt, or local salt with impurities removed, such as edible salt.

In an embodiment of the disclosure, the purified beef fat is deodorized, decolored and degummed beef fat, such as edible beef fat, and is preferably edible beef fat of high quality and good quality.

In an embodiment of the disclosure, the gel emulsion preferably comprises the following components per 100 kg: 30 kg of purified beef fat, 3 kg of whey protein isolate, 0.8775 kg of purified table salt, 1 kg of saccharide, 0.8 kg of sodium tripolyphosphate, 3 kg of edible gelatin, and 61.3225 kg of drinking water.

The disclosure further provides a preparation method of the above gel emulsion, comprising the following steps:

1) taking and melting 10-45 kg of purified beef fat at 70-80° C. for later use;

2) preparing a protein solution: weighing 0.5-4.5 kg of whey protein isolate, 0-2 kg of purified table salt, 0.5-3 kg of saccharide, 0.4-1.5 kg of sodium tripolyphosphate, and 26-57 kg of water, dissolving the components at room temperature for 1-3 h, heating the solution to 70-75° C., thermally insulating the solution for 30-40 min, and then cooling the solution to 50-60° C. for later use;

3) preparing a gelatin solution: soaking 2-5 kg of edible gelatin in 13-28 kg of water for 1-3 h, heating the solution to 70-75° C., maintaining the temperature for 30-40 min, and then cooling the solution to 50-60° C. for later use; and 4) adding 10-45 kg of melted purified beef fat to the protein solution at 55-60° C., sufficiently stirring the mixture, then homogenizing the mixture 1-3 times at a pressure of 100-300 bar to prepare an emulsion, mixing the prepared emulsion with the gelatin solution, and sufficiently stirring the mixture to obtain the gel emulsion.

In an embodiment of the disclosure, high-speed shearing is performed before homogenization, wherein the shearing speed is 4000-8000 rpm, and the shearing time is 10-30 min.

Finally, the disclosure provides a production method of marbled beef, comprising the following steps: selecting beef with a fat content of less than 3%, thawing the beef at 0-10° C., and cutting off large connective tissue for later use; injecting the beef with the gel emulsion; and performing wrap shaping, quick-freezing, cutting and packaging, and hot dipping to obtain the marbled beef.

In an embodiment of the disclosure, the method specifically comprises the following steps:

(1) thawing of raw meat: selecting beef with a fat content of less than 3%, thawing the beef at 0-10° C., and cutting off large connective tissue for later use;

(2) preparation of a gel emulsion: 100 kg of gel emulsion comprises 10-45 kg of purified beef fat, 0.5-4.5 kg of whey protein isolate, 0-2 kg of purified table salt, 0.5-3 kg of saccharide, 0.4-1.5 kg of sodium tripolyphosphate, 2-5 kg of edible gelatin, and 39-85 kg of water;

(3) injection: injecting the beef with the gel emulsion by using a high-pressure injection machine according to an injection amount of 15%-32% of the beef by mass;

(4) wrap shaping: packaging the beef injected with the gel emulsion into a wrap shaping bag for performing wrap shaping;

(5) quick-freezing: quickly freezing the wrap shaped beef at −30° C. or below;

(6) cutting and packaging: cutting and packaging the quick-frozen beef according to product requirements; and (7) hot dipping: soaking the packaged marbled beef together with the package in hot water at 40-60° C. for 1-2 seconds, and then storing the marbled beef at −18° C. or below.

In an embodiment of the disclosure, a processing workshop of the marbled beef is maintained at 0-7° C.

In an embodiment of the disclosure, preferably, the beef is beef ribeye and sirloin beef.

Beneficial Technical Effects Obtained by the Disclosure (1) Marbled beef is usually stored, transported and sold to consumers in frozen form. Consumers thaw marbled beef and cook it. Therefore, the freeze-thaw stability of the gel emulsion is a major factor affecting the quality of marbled beef. Marbled beef prepared in the prior art must be thawed slowly at 10° C. or below, the thawing conditions need to be strictly controlled, and an emulsion flows out of the thawed marbled beef. Marbled beef prepared using the gel emulsion of the disclosure has better freeze-thaw stability, shows a white fat pattern at low temperature (0-25° C.), and is closer to natural marbled beef in appearance and structure. In an environment of 25° C. or below, no emulsion flows out during thawing, and the sensory properties of the product can be well maintained. The thawing method is not limited, the application range is wider, and the storage and consumption are more convenient. During the cooking process, when the temperature is higher than 40° C., the solid gel emulsion is reconverted to a liquid state, providing a fresh, tender, fat and juicy taste with rich aroma.

(2) The gel emulsion provided by the disclosure is liquid and is low in viscosity (80-120 mPa·s at 55° C.) when the temperature is higher than 40° C., and the gel emulsion is convenient for injection into beef, and can be uniformly dispersed in beef to form a delicate marble pattern. When the temperature is lower than 20° C., the gel emulsion forms a solid in the beef tissue.

(3) In the disclosure, the purified beef fat is used as the oil and fat component in the gel emulsion, which can increase the aroma of beef without the problem that vegetable oil is easily oxidized. Glucose and sodium tripolyphosphate are added to the gel emulsion in the disclosure to synergistically improve the water holding capacity of the gel emulsion, increase the water holding capacity of the gel emulsion from 70% to 95% or more, up to 98%, avoid the outflow of water in the gel emulsion, and ensure the flavor and appearance of marbled beef. At the same time, the presence of the glucose and the sodium tripolyphosphate can reduce the potential of the gel emulsion, and the potential can reach −25 mV, making the gel emulsion more stable.

DETAILED DESCRIPTION

Figure 1:
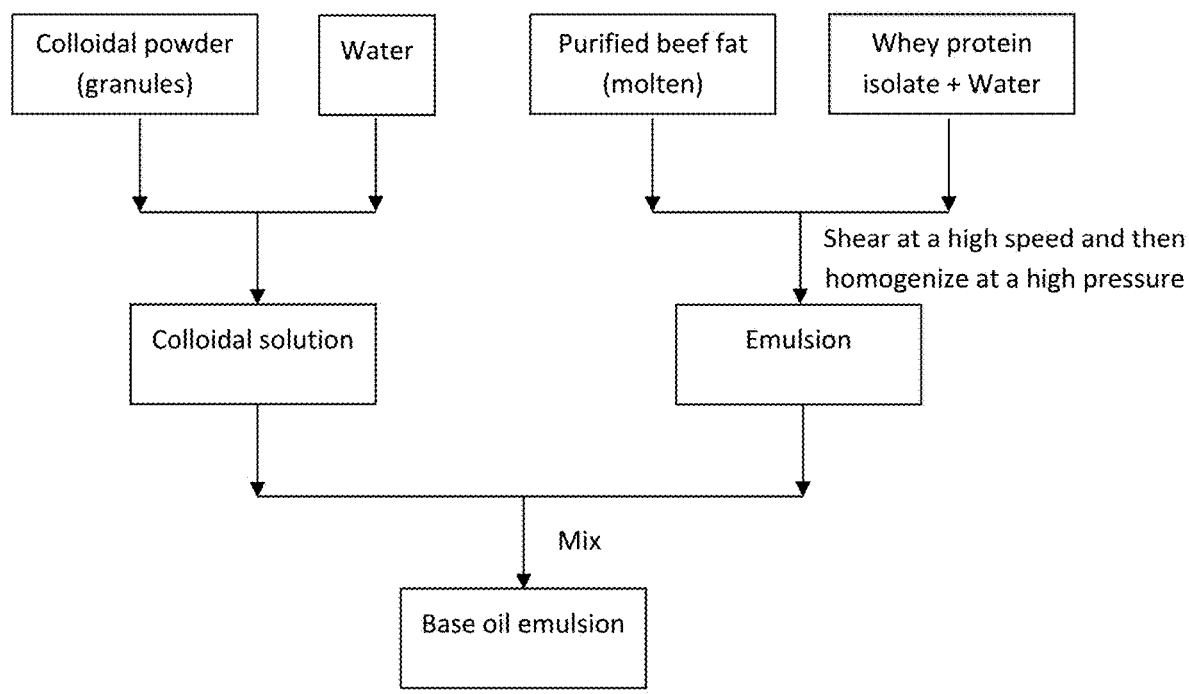
FIG. 1: Schematic diagram of a preparation process of a gel emulsion.

Manufacturer Information of Raw Materials:
Purified beef fat: Zhangjiagang Tongqing Food Co., Ltd.
Edible gelatin: Hebei Runying Biotechnology Co., Ltd. Gel strength 220

Method for measuring water holding capacity and involved equipment: Refrigerated centrifuge (meeting conditions of 10000 rpm and 4° C.). With a microbalance, 5 g of a thawed sample (M1) is accurately weighed and put into a 50 mL centrifuge tube, the sample is centrifuged at 10000 rpm for 15 min at 4° C., the moisture is carefully sucked out with filter paper, and then the sample is weighed with an analytical balance after inversion for 15 min. The weight M2 of the gel emulsion after dehydration equals to the difference between the total weight of the centrifuge tube and the sample after water absorption and the weight of the centrifuge tube. WHC=M2/M1, wherein M1 is the weight of the gel emulsion before centrifugation, and M2 is the weight of the gel emulsion after centrifugal dehydration.

Method for measuring elastic modulus and involved equipment: Rheometer (Waters Corporation DHR-3, USA), 40 mm plate, 1% stress, 1000 μm plate spacing. After thermal insulation at 55° C. for 60 s, the temperature is reduced to 4° C. at a rate of 2° C./min.

Potential test method and involved equipment: Nano particle size and ZETA potentiometer (Zetasizer nano ZS from Malvern Panalytical, UK). The newly prepared gel emulsion is measured by gradient dilution with ultra-pure water 1000 times.

Microscope model: Leica microscope DM2700P (including a temperature control device).

Example 1

(1) Thawing of raw meat: 350-400 kg of qualified beef ribeye was selected and thawed in a constant temperature and humidity (0-4° C.) environment for 3-5 days, large connective tissue was cut off after thawing for later use, and a processing workshop of the marbled beef was maintained at 0-7° C.

(2) Preparation of a gel emulsion: 100 kg of gel emulsion comprises 30 kg of purified beef fat, 3 kg of whey protein isolate, 0.8775 kg of purified table salt, 1 kg of anhydrous glucose, 0.8 kg of sodium tripolyphosphate, 3 kg of edible gelatin, and 61.3225 kg of drinking water.

Preparation Method of the Gel Emulsion:

1) preparation of the purified beef fat: 30 kg of purified beef fat was taken and molten at 70-75° C. for later use;

2) preparation of a protein solution: 3 kg of whey protein isolate, 0.8775 kg of purified table salt, 1 kg of anhydrous glucose, 0.8 kg of sodium tripolyphosphate and 44.3225 kg of drinking water were weighed, the components were dissolved at room temperature for 2 h, the solution was heated to 70° C. and thermally insulated for 30 min, and then the solution was cooled to 55° C. for later use;

3) preparation of a gelatin solution: 3 kg of edible gelatin was soaked in 17 kg of drinking water for 2 h, the solution was heated to 70° C., the temperature was maintained for 30 min, and then the solution was cooled to 55-60° C. for later use; and 4) preparation of the gel emulsion: 30 kg of melted purified beef fat was added to the protein solution at 55-60° C., the mixture was sufficiently stirred, then the mixture was homogenized at a pressure of 100 bar to prepare an emulsion, the prepared emulsion was mixed with the gelatin solution, the mixture was sufficiently stirred to obtain the gel emulsion, and the prepared gel emulsion was stored at 55-60° C. for use.

(3) Injection: The beef was injected with the gel emulsion by using a high-pressure injection machine according to an injection amount of 20%-25% of the beef by mass.

(4) Wrap shaping: The beef injected with the gel emulsion was packaged into a wrap shaping bag with safe quality for performing wrap shaping.

(5) Quick-freezing: The wrap shaped beef was quickly frozen at −30° C. or below.

(6) Cutting and packaging: The quick-frozen beef was cut and packaged according to product requirements.

(7) Hot dipping: The packaged marbled beef together with the package was soaked in hot water at 55° C. for 1-2 seconds, and then the marbled beef was stored at −18° C.

Figure 2:
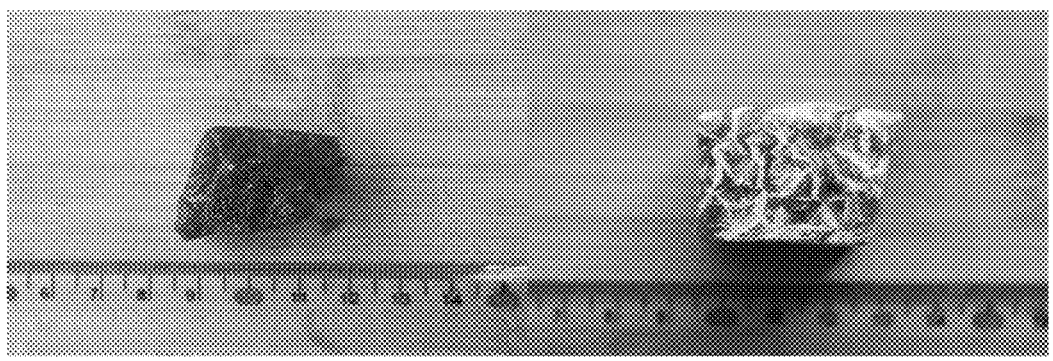
FIG. 2: Marbled beef prepared in Example 1, wherein (a) is raw beef, and (b) is marbled beef.

Thereby, the marbled beef was obtained. As shown in FIG. 2 (b), the obtained beef has a uniformly dispersed marble pattern at 0-25° C., the fat pattern is white, and when the temperature is higher than 40° C., the solid gel emulsion is reconverted to a liquid state, providing a fresh, tender, fat and juicy taste with rich aroma.

Example 2

(1) Thawing of raw meat: 350-400 kg of qualified beef ribeye was selected and thawed in a constant temperature and humidity (0-4° C.) environment for 3-5 days, large connective tissue was cut off after thawing for later use, and a processing workshop of the marbled beef was maintained at 0-7° C.

(2) Preparation of a gel emulsion: 100 kg of gel emulsion comprises 30 kg of purified beef fat, 3 kg of whey protein isolate, 0.8775 kg of purified table salt, 1 kg of anhydrous glucose, 0.8 kg of sodium tripolyphosphate, 3 kg of edible gelatin, and 61.3225 kg of drinking water.

Preparation Method of the Gel Emulsion:

1) preparation of the purified beef fat: 30 kg of purified beef fat was taken and molten at 70-75° C. for later use;

2) preparation of a protein solution: 3 kg of whey protein isolate, 0.8775 kg of purified table salt, 1 kg of anhydrous glucose, 0.8 kg of sodium tripolyphosphate and 44.3225 kg of drinking water were weighed, the components were dissolved at room temperature for 2 h, the solution was heated to 70° C. and thermally insulated for 30 min, and then the solution was cooled to 55° C. for later use;

3) preparation of a gelatin solution: 3 kg of edible gelatin was soaked in 17 kg of drinking water for 2 h, the solution was heated to 70° C., the temperature was maintained for 30 min, and then the solution was cooled to 55-60° C. for later use; and 4) preparation of the gel emulsion: 30 kg of melted purified beef fat was added to the protein solution at 55-60° C., the mixture was sufficiently stirred, then the mixture was homogenized at a pressure of 100 bar to prepare an emulsion, the prepared emulsion was mixed with the gelatin solution, the mixture was sufficiently stirred to obtain the gel emulsion, and the prepared gel emulsion was stored at 55-60° C. for use.

(3) Injection: The beef was injected with the gel emulsion by using a high-pressure injection machine according to an injection amount of 28%-32% of the beef by mass.

(4) Wrap shaping: The beef injected with the gel emulsion was packaged into a wrap shaping bag with safe quality for performing wrap shaping.

(5) Quick-freezing: The wrap shaped beef was quickly frozen at −30° C. or below.

(6) Cutting and packaging: The quick-frozen beef was cut and packaged according to product requirements.

(7) Hot dipping: The packaged marbled beef together with the package was soaked in hot water at 55° C. for 1-2 seconds, and then the marbled beef was stored at −18° C.

Example 3

(1) Thawing of raw meat: 350-400 kg of qualified beef ribeye was selected and thawed in a constant temperature and humidity (3-6° C.) environment for 3-5 days, large connective tissue was cut off after thawing for later use, and a processing workshop of the marbled beef was maintained at 0-7° C.

(2) Preparation of a gel emulsion: 100 kg of gel emulsion comprises 15 kg of purified beef fat, 1.5 kg of whey protein isolate, 1.5 kg of purified table salt, 2 kg of anhydrous glucose, 1.2 kg of sodium tripolyphosphate, 4 kg of edible gelatin, and 74.8 kg of drinking water.

Preparation Method of the Gel Emulsion:

1) preparation of the purified beef fat: 15 kg of purified beef fat was taken and molten at 70-75° C. for later use;

2) preparation of a protein solution: 1.5 kg of whey protein isolate, 1.5 kg of purified table salt, 2 kg of anhydrous glucose, 1.2 kg of sodium tripolyphosphate and 51 kg of drinking water were weighed, the components were dissolved at room temperature for 2 h, the solution was heated to 70° C. and thermally insulated for 30 min, and then the solution was cooled to 55° C. for later use;

3) preparation of a gelatin solution: 4 kg of edible gelatin was soaked in 23.8 kg of drinking water for 2 h, the solution was heated to 70° C., the temperature was maintained for 30 min, and then the solution was cooled to 55-60° C. for later use; and 4) preparation of the gel emulsion: 15 kg of melted purified beef fat was added to the protein solution at 55-60° C., the mixture was sufficiently stirred, then the mixture was homogenized at a pressure of 100 bar to prepare an emulsion, the prepared emulsion was mixed with the gelatin solution, the mixture was sufficiently stirred to obtain the gel emulsion, and the prepared gel emulsion was stored at 55-60° C. for use.

(3) Injection: The beef was injected with the gel emulsion by using a high-pressure injection machine according to an injection amount of 28%-32% of the beef by mass.

(4) Wrap shaping: The beef injected with the gel emulsion was packaged into a wrap shaping bag with safe quality for performing wrap shaping.

(5) Quick-freezing: The wrap shaped beef was quickly frozen at −30° C. or below.

(6) Cutting and packaging: The quick-frozen beef was cut and packaged according to product requirements.

(7) Hot dipping: The packaged marbled beef together with the package was soaked in hot water at 55° C. for 1-2 seconds, and then the marbled beef was stored at −18° C.

Example 4

(1) Thawing of raw meat: 350-400 kg of qualified sirloin beef was selected and thawed in a constant temperature and humidity (0-4° C.) environment, large connective tissue was cut off after thawing for later use, and a processing workshop of the marbled beef was maintained at 0-7° C.

(2) Preparation of a gel emulsion: 100 kg of gel emulsion comprises 40 kg of purified beef fat, 2 kg of whey protein isolate, 1 kg of purified table salt, 2 kg of sucrose, 1 kg of sodium tripolyphosphate, 5 kg of edible gelatin, and 49 kg of drinking water.

Preparation Method of the Gel Emulsion:

1) preparation of the purified beef fat: 40 kg of purified beef fat was taken and molten at 70-75° C. for later use;

2) preparation of a protein solution: 2 kg of whey protein isolate, 1 kg of purified table salt, 2 kg of sucrose, 1 kg of sodium tripolyphosphate and 36 kg of drinking water were weighed, the components were dissolved at room temperature for 3 h, the solution was heated to 75° C. and thermally insulated for 40 min, and then the solution was cooled to 60° C. for later use;

3) preparation of a gelatin solution: 5 kg of edible gelatin was soaked in 13 kg of drinking water for 3 h, the solution was heated to 75° C., the temperature was maintained for 40 min, and then the solution was cooled to 55-60° C. for later use; and 4) preparation of the gel emulsion: 40 kg of melted purified beef fat was added to the protein solution at 55-60° C., the mixture was sufficiently stirred, then the mixture was homogenized once at a pressure of 100 bar to prepare an emulsion, the prepared emulsion was mixed with the gelatin solution, the mixture was sufficiently stirred to obtain the gel emulsion, and the prepared gel emulsion was stored at 55-60° C. for use.

(3) Injection: The beef was injected with the gel emulsion by using a high-pressure injection machine according to an injection amount of 15%-18% of the beef by mass.

(4) Wrap shaping: The beef injected with the gel emulsion was packaged into a wrap shaping bag with safe quality for performing wrap shaping.

(5) Quick-freezing: The wrap shaped beef was quickly frozen below −30° C.

(6) Cutting and packaging: The quick-frozen beef was cut and packaged according to product requirements.

(7) Hot dipping: The packaged marbled beef together with the package was soaked in hot water at 45° C. for 1-2 seconds, and then the marbled beef was stored at −18° C. or below.

Figure 3:
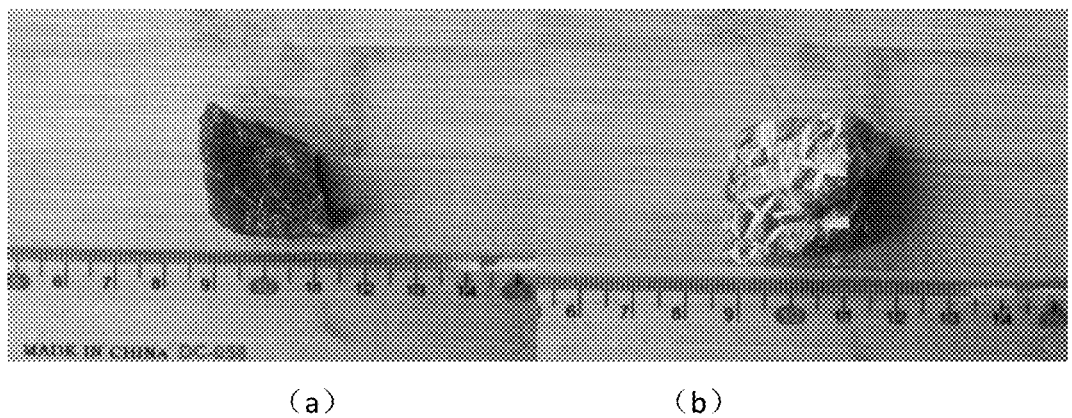
FIG. 3: Marbled beef prepared in Example 4, wherein (a) is raw beef, and (b) is marbled beef.

Thereby, the marbled beef was obtained. As shown in FIG. 3 (b), the obtained beef has a uniformly dispersed marble pattern at 0-25° C., the fat pattern is white, and when the temperature is higher than 40° C., the solid gel emulsion is reconverted to a liquid state, providing a fresh, tender, fat and juicy taste with rich aroma.

Comparative Example 1

Agar or gellan gum was used instead of edible gelatin to prepare gel emulsions, wherein the agar needs to be dissolved when a colloidal solution is boiled, and the gellan gum is dissolved at 85° C. The obtained colloidal solution and an emulsion were mixed at 70° C., and the rest of operations were the same as those in step 1 to prepare a gel emulsion containing the agar or the gellan gum.

The changes in elastic modulus of edible gelatin, gellan gum and agar at different concentrations and temperatures were determined. As shown in the results of FIG. 2, different colloids have very different properties. The agar has a higher coagulation temperature, and the gel emulsion formed after coagulation has a larger elastic modulus and a higher hardness at normal temperature. In addition, the agar gel emulsion has low water holding capacity after freeze-thaw and has poor freeze-thaw stability. The gellan gum type gel emulsion has a relatively fast rate of change in elastic modulus with temperature, and can form a solid in a short period of time. The formed gel emulsion (that is, the gel emulsion coagulated state) has a large elastic modulus and has a hard structure like the agar gel emulsion.

It can be seen that such properties of agar and gellan gum make the gel emulsions prepared therefrom difficult to disperse uniformly in beef and form a uniform marble pattern, and the agar and gellan gum are not suitable for processing artificial marbled beef.

Comparative Example 2

I: The composition of the gel emulsion did not contain glucose. The preparation method and the rest of the composition were the same as those in Example 1, and drinking water was added to 100 kg to prepare a gel emulsion I.

II: The composition of the gel emulsion did not contain sodium tripolyphosphate. The preparation method and the rest of the composition were the same as those in Example 1, and drinking water was added to 100 kg to prepare a gel emulsion II.

III: The composition of the gel emulsion did not contain glucose or sodium tripolyphosphate. The preparation method and the rest of the composition were the same as those in Example 1, and drinking water was added to 100 kg to prepare a gel emulsion III.

The water holding capacity and potential of the gel emulsions I, II, III and the gel emulsion in Example 1 were determined. The determination results of the water holding capacity are shown in FIG. 3. It can be seen that the addition of glucose alone increases the water holding capacity of the gel emulsion III slightly, the addition of sodium tripolyphosphate alone increases the water holding capacity from 70% to about 84%, and the addition of both glucose and sodium tripolyphosphate increases the water holding capacity of the gel emulsion to 98%, which was significantly improved. The greater water holding capacity proves that the prepared gel emulsion can maintain good freeze-thaw stability (that is, reduce the damage of freezing to the structure), so that the product can better maintain the original structure after freeze-thaw.

Figure 4A:
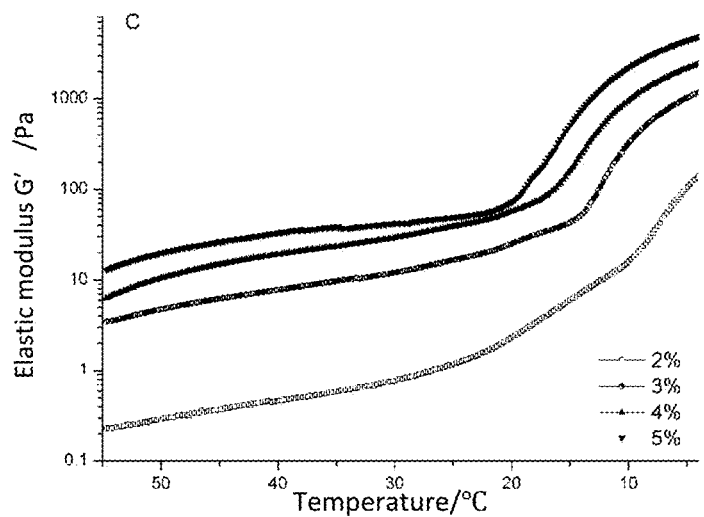
FIGS. 4A, 4B and 4C: Changes in elastic modulus of edible gelatin, gellan gum and agar at different concentrations and temperatures, respectively.
Figure 4B:
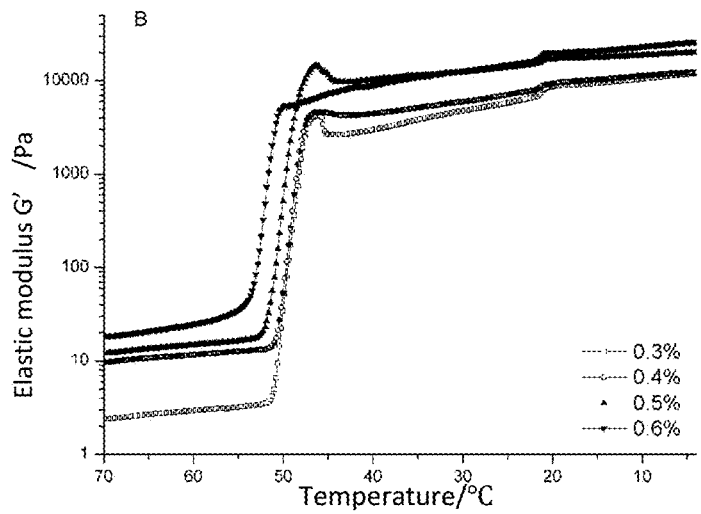
Figure 4C:
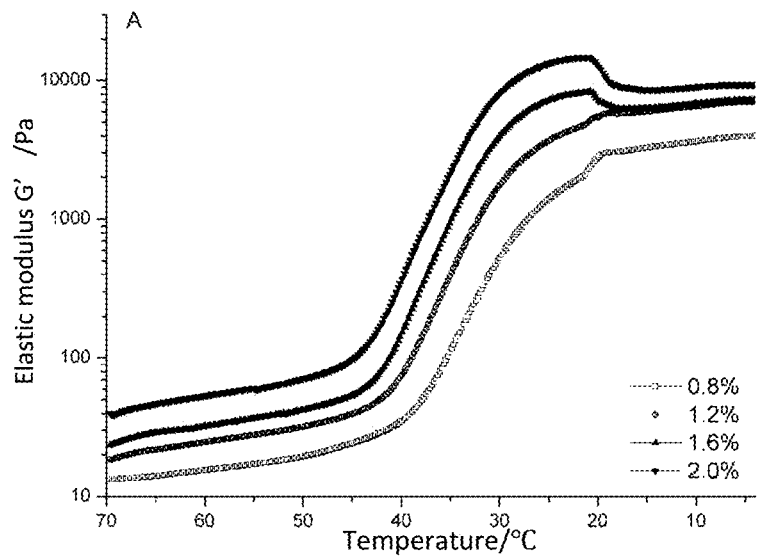

The potential test results are shown in FIGS. 4A, 4B and 4C. For emulsions, the greater the absolute value of the potential, the better it is to maintain the stability of the emulsion. It can be seen that the addition of glucose alone increases the potential value of the gel emulsion III slightly, the addition of sodium tripolyphosphate alone reduces the potential value from −14 mV to about −21 mV, and the addition of both glucose and sodium tripolyphosphate increases the potential of the gel emulsion to −24 mV. Therefore, the addition of both the glucose and sodium tripolyphosphate significantly enhances the stability of the gel emulsion.

Figure 5:
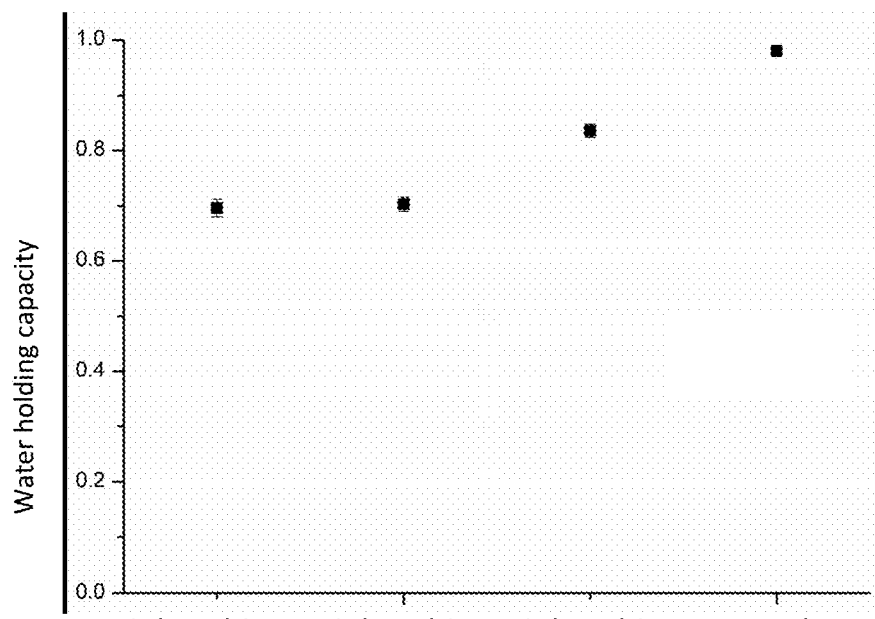
FIG. 5: Results of water holding capacity measurement of gel emulsions I, II, III and the gel emulsion in Example 1.
Figure 6:
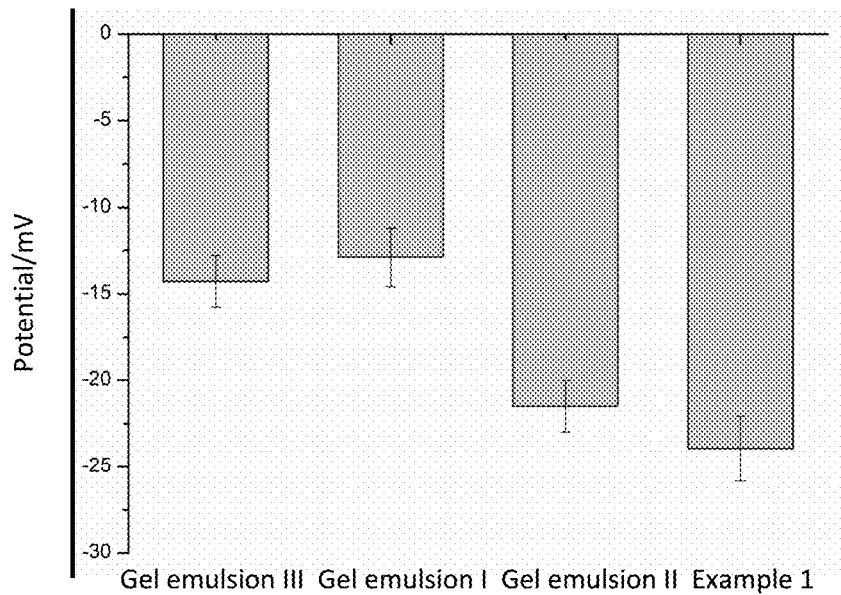
FIG. 6: Potential measurement results of gel emulsions I, II, III, and the gel emulsion in Example 1.
Figure 7:
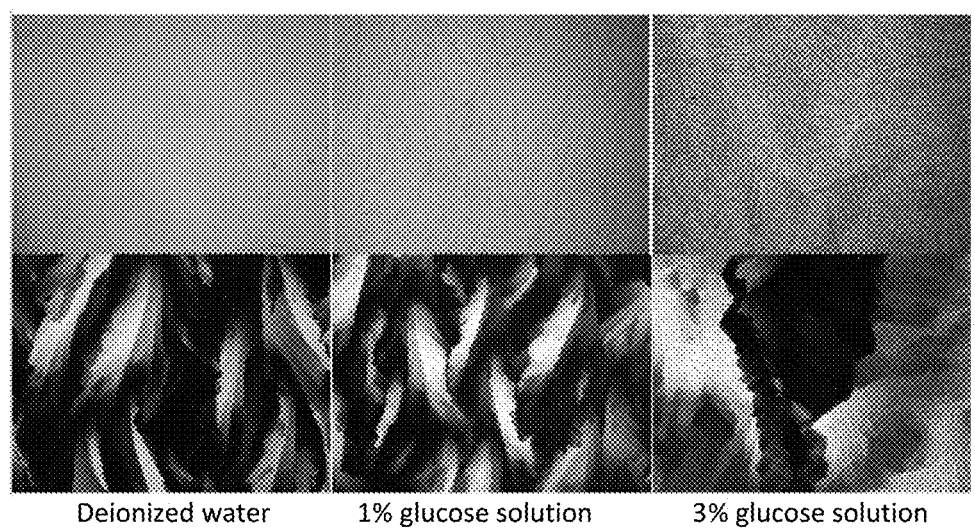
FIG. 7: Microscope images of 100 times magnification of glucose aqueous solutions of different concentrations when the glucose aqueous solutions are crystallized at −20° C. The upper images are microscope images, and the lower images are pictures under polarized light in the same field of view.

In addition, the presence of glucose also affects the crystallization behavior of water, and affects the size of crystals. The results are shown in FIG. 5, which shows microscope images of 100 times magnification when aqueous glucose solutions of different concentrations crystallize at −20° C. The glucose concentrations are 0%, 1% and 3% from left to right. The upper images are microscope images, and the lower images are pictures under polarized light. It can be seen that the addition of glucose can significantly reduce the size of ice crystals. The smaller the ice crystals (excess addition of glucose may affect the taste of beef), the less destructive to the gel emulsion structure, and the better the freeze-thaw stability of gelatin in the gel emulsion, thereby significantly affecting the appearance, edibility and storage of marbled beef.

It can be seen that the addition of the glucose and sodium tripolyphosphate is essential.

Comparative Example 3

When the gelatin content was 1 kg, the content of drinking water in the gel emulsion was 63.3225 kg, and the rest of steps and conditions were the same as those in Example 1. Due to the low colloid content, the prepared gel emulsion is liquid at normal temperature, and a white emulsion flows out when the prepared gel emulsion is placed at room temperature, which affects the sensory properties of the prepared marbled beef.

When the gelatin content was 6 kg, the content of drinking water in the gel emulsion was 58.3225 kg, and the rest of steps and conditions were the same as those in Example 1. The prepared gel emulsion is too viscous. When added to beef, the emulsion is not easy to disperse and form a uniform marble pattern, but accumulates in the place where the emulsion is added and forms apparently thick fatty tissue, and the prepared marbled beef has poor quality.

What is claimed is:

1. Base oil for producing marbled beef, comprising the following components per 100 kg:
   10 to 45 kg of purified beef fat,
   0.5 to 4.5 kg of whey protein isolate,
   0 to 2 kg of purified table salt,
   0.5 to 3 kg of glucose,
   0.4 to 1.5 kg sodium tripolyphosphate,
   2 to 5 kg of edible gelatin, and
   39 to 85 kg of water.

2. The base oil according to claim 1, wherein 100 kg of the base oil comprises:
   30 kg of purified beef fat,
   3 kg of whey protein isolate,
   0.8775 kg of purified table salt,
   1 kg of glucose,
   0.8 kg of sodium tripolyphosphate,
   3 kg of edible gelatin, and
   61.3225 kg of drinking water.

\* \* \* \* \*